US 8,693,689 B2

(12) United States Patent
Belenkiy et al.

(10) Patent No.: US 8,693,689 B2
(45) Date of Patent: Apr. 8, 2014

(54) LOCATION BROKERING FOR PROVIDING SECURITY, PRIVACY AND SERVICES

(75) Inventors: Mira Belenkiy, Redmond, WA (US); Henry Nelson Jerez Morales, Sammamish, WA (US); Thomas Michael Roeder, Redmond, WA (US); Matt Dyor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 12/917,452

(22) Filed: Nov. 1, 2010

(65) Prior Publication Data
US 2012/0106738 A1    May 3, 2012

(51) Int. Cl.
*H04L 29/06*    (2006.01)

(52) U.S. Cl.
USPC ......................................................... 380/270

(58) Field of Classification Search
None
See application file for complete search history.

(56) References Cited

U.S. PATENT DOCUMENTS

| | | | |
|---|---|---|---|
| 5,778,304 A | 7/1998 | Grube et al. | |
| 6,859,791 B1 | 2/2005 | Spagna et al. | |
| 7,239,871 B2 | 7/2007 | Shamp et al. | |
| 7,738,898 B2* | 6/2010 | Aaron ........................... | 455/519 |
| 2003/0112977 A1* | 6/2003 | Ray et al. ...................... | 380/270 |
| 2007/0237096 A1 | 10/2007 | Vengroff et al. | |
| 2008/0083036 A1 | 4/2008 | Ozzie et al. | |
| 2008/0091763 A1 | 4/2008 | Devonshire et al. | |
| 2008/0227473 A1* | 9/2008 | Haney ............................ | 455/457 |
| 2009/0271462 A1* | 10/2009 | Schneider ...................... | 708/250 |
| 2010/0162374 A1* | 6/2010 | Nair ................................ | 726/7 |

OTHER PUBLICATIONS

Freudiger, Julien, Neu Raoul, Hubuaux, Jean Pierre—Private Sharing of USer Location Over Online Social Networks—Presented at HotPETs, Berlin, Jul. 21-23.*
Šikšnys el al. "A Location Privacy Aware Friend Locator" 2009—pp. 405-410.*
"Private Sharing of User Location over Online Social Networks" by Julien et al.*
"A location Privacy Aware Friend Locator" by Siksnys.*
Julien et al. "Private Sharing of User location over online Social Networks" 2010.*
Šikšnys el al. "A Location Privacy Aware Friend Locator".*
Li, J., J. Jannotti, D. S. J. De Couto, D. R. Karger, R. Morris, A scalable location service for geographic ad hoc routing, Proc. of the Sixth Annual Int'l Conf. on Mobile Computing and Networking, Aug. 6-11, 2000, pp. 120-130, Boston, MA, USA.
Puttaswamy, K. P. N., B. Y. Zhao, Preserving privacy in location-based mobile social applications, Proc. of the Eleventh Workshop on Mobile Computing Systems & Applications, Feb. 2010, ACM, New York, NY, USA.

* cited by examiner

*Primary Examiner* — Oscar Louie
*Assistant Examiner* — Younes Naji
(74) *Attorney, Agent, or Firm* — Dan Choi; Carole Boelitz; Micky Minhas

(57) ABSTRACT

Location brokering technique embodiments are presented that employ sensor data captured by a user's mobile device to determine the device's location, encrypt the location data and store it in a database. The location data is encrypted in such a way that it is possible to determine when a user's mobile device is currently in the same vicinity as another user's mobile device who is a member of the same group. However, the actual location and relative mobility or immobility of the users cannot be ascertained except by the users themselves via a decryption procedure or by trusted components. Services are provided can read the stored encrypted location data, processes it to determine if group members are in the same vicinity, and either respond to user queries about the location of other members of a group the user belongs to, or push this information to appropriate users.

5 Claims, 10 Drawing Sheets

LOCATION BROKERING FOR PROVIDING SECURITY, PRIVACY AND SERVICES

BACKGROUND

The use of communication-enabled mobile computing devices (or mobile devices for short), such as cellular telephones, personal digital assistants (PDAs), netbook computers, cars, airplanes and so on, has become quite common. Typically, devices of this type are capable of using on-board sensors to capture sensor data that can be used to determine the location of the device. For example, these devices are often capable of recording cell-phone or radio tower strength measurements, Wi-Fi network strength data, and satellite Global Positioning System (GPS) data, as well as other types of data that can be used to determine location.

Knowing the location of mobile devices makes it possible to provide a variety of location-based services to mobile device users. For example, members of both formal and informal (ad-hoc) groups of mobile device users would like to know if other group members are geographically close so that they can meet or interact via their mobile devices. This is particularly useful when these users are travelling and are not familiar with other group members that may be in the area.

SUMMARY

The location-brokering technique embodiments described herein generally provide a way for users of mobile devices to make their location available in a private and secure manner to other members of groups they belong to through various location services without the service learning the location and relative mobility of users.

In one general implementation, the foregoing is accomplished by users belonging to one or more groups using their mobile devices to periodically capture sensor data which is indicative of the location of their devices and providing it to modules that determine each device's location and encrypt the location data. This data is later sent to a location service that will store and manage it. For each mobile device associated with a user in each group of mobile device users, this encryption includes encrypted grid coordinates of a grid cell of a location grid in which the location of the mobile device falls. In one implementation, the encryption is performed with a public key encryption scheme using a group public key and an initialization vector associated with the group. In another implementation, where the mobile device performs the encryption, the encryption can be done with a symmetric key encryption scheme using a group secret key and an initialization vector associated with the group. The initialization vector is computed based on a shared group secret key and a current time interval such that the initialization vector computed by members of a group matches within the same time interval, but varies from one time interval to the next. In this way, the aforementioned encrypted location data for mobile devices match for users in the same group and located in the same grid cell within the same time interval, but otherwise do not. Thus, it is possible to determine from the encrypted data that users belonging to the same group are located in the same grid cell at the same time, but not their exact location, nor their past whereabouts, nor whether they have changed their location since the last time interval.

A location service can then provide users with location-related information based on the aforementioned encrypted location data. In one general implementation this involves a location service providing, either upon request or as pushed, one or more neighbor tuples to a mobile device. Each neighbor tuple can include a group identifier associated with a group of users of which the receiving user is a member (e.g. group name or group public key) and an encrypted location message which was generated by the aforementioned modules as part of the encrypted location data. This encrypted location message includes the location of a mobile device; and can include a user identifier associated with a user of the mobile device, or the time the mobile device was at the location, or both. For each neighbor tuple received, the receiving mobile device obtains a decryption key associated with the group identifier found in the neighbor tuple (if included), and uses the decryption key to decrypt the encrypted location message via a decryption scheme corresponding to the encryption scheme used to encrypt the location message. If the group identifier is omitted from the neighbor tuple, the receiving mobile device can try each encryption key to which it has access until it decrypts the location successfully. The mobile device then outputs the user identifier assigned to a user of the mobile device associated with the neighbor tuple, the location of that mobile device and the time the mobile device was at that location (if time was included). It is noted that if the user identifier was not included in the encrypted location message, it is associated with the neighbor tuple and sent unencrypted along with the tuple.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
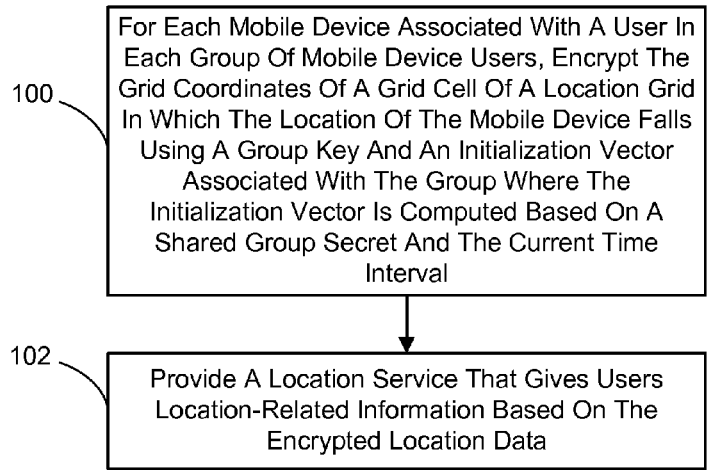
FIG. 1 is a flow diagram generally outlining one embodiment of a process for location brokering.

In the following description of location brokering technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Location Brokering

The location brokering technique embodiments described herein generally divide the earth into a grid. Each location on earth is associated with a grid coordinate. The grid does not have to be uniform or linear, and it may change over time. Different users may have different grids, as long as users in the same group agree on a grid. The location brokering technique embodiments store the grid coordinates of each of a group of users encrypted under a key of the user's group for security reasons. In the case of public key encryption, it would use the group's public key to encrypt, and in the case of symmetric key encryption, it would use the group's secret key. An initialization vector (or randomizing seed) is used in the encryption. This initialization vector is the sole source of randomness for the encryption and it is provided by the user and, in one implementation, is a function of a shared group secret key of the group and time. In this way, whenever the encrypted grid coordinates of members of a group match, it is known that they are geographically close. In one implementation, this location information is pushed to the appropriate users or third party services authorized by the users. In another implementation, the location information is supplied to other authorized users or services when it is requested.

The location brokering technique embodiments described herein provide strong security and privacy guarantees. In general, mobile device location information is stored in a database in such a way that useful services can be provided to users without the stored information divulging the actual location of the mobile devices. More particularly, when looking at the encrypted location data, the exact location of users at any point in time cannot be determined, and distances between group members (in the past or present) cannot be determined, because only grid coordinates are employed. The service can only determine whether two group members were in the same grid coordinate at the same time. Likewise, the grid coordinates of users at any previous point in time, or whether a user is in the same grid coordinate he or she was previously, cannot be determined because the initialization vector is time dependent and vectors generated in two different time periods will not match. Still further, it typically cannot be determined from the encrypted location data whether users who are not part of the same group were ever in the same grid coordinates, either simultaneously or at different times, because the initialization vector is also group dependent owing to the shared group secret key, so vectors generated for different groups will not match. The only thing that can be ascertained from the encrypted location data is whether group members were located at the same grid coordinates at the same time—and even then this can only be determined by someone having access to the encrypted location data.

Referring to FIG. 1, in one general implementation of location brokering, the location data associated with multiple mobile devices is encrypted as follows. For each mobile device associated with a user in each group of mobile device users, grid coordinates of a grid cell of a location grid in which the location of the mobile device falls are encrypted, using a group key (either public key or symmetric key, depending on the type of encryption as noted below) and an initialization vector associated with the group where the initialization vector is computed based on a shared group secret and the current time interval (100). In this way, the initialization vector computed by members of a group matches within the same time interval, but varies from one time interval to the next. This means that the encrypted location data for mobile devices associated with users in the same group and located in the same grid cell match within the same time interval, but vary otherwise. At least one location service can then be provided that gives users location-related information based on the encrypted location data (102). It is noted that when the encryption occurs on the mobile device, either symmetric or public key encryption can be used. If the encryption occurs on the cloud service provider, a public key encryption scheme may be used.

The following sections will provide a more detailed description of the foregoing features including further details on a suitable operating environment, encrypting and storing location data, and providing proximity detection and other location brokering services.

1.1 Operating Environment

Before the location brokering technique embodiments are described in more detail, a general description of a suitable operating environment in which portions thereof may be implemented will be described. In general, referring to FIG. 2, the operating environment involves the use of multiple mobile devices 200 (such as an Internet-enabled cellular telephones, personal digital assistants (PDAs), netbook computers, cars, airplanes and so on), each of which may be in the possession of a different user. These mobile devices 200 communicate with a location data engine and services (typically via a wireless network) which run in the cloud 202. In other words, the mobile devices 200 communicate with the location data engine and services by accessing remote computing sites. Each user has a pre-established account with the engine and services and their mobile devices 200 communicate over a secure authenticated channel using conventional methods. Some of the components that comprise the location data engine (namely, the location computation module 204, the position processing module 206, and the location database module 208) can be located either on some or all mobile device(s) 200 and/or in the cloud 202. Hence, FIG. 2 has dotted-lines around these components, as they can reside either on a mobile device 200 or the cloud 202. It is noted that the location data engine and services can be hosted on one or multiple cooperating computing devices residing in the cloud 202.

Each mobile device 200 continuously collects sensor data captured by one of more sensors resident in the mobile device. This sensor data is raw in the sense that it is indicative of the location of the mobile device, but may need to be processed to establish the location. In one implementation, this sensor data is sent to a location computation module 204, which in turn computes the location of the mobile device based on the sensor data. It is noted that this module 204 can be resident on the mobile device 200, or resident in the cloud 202, as will be described in more detail later. For example, in one implementation, a user's mobile device collects cell-phone tower signal strength data and sends it over short message service (SMS) to a cloud-resident location computation module 204 via a proxy. The location computation module 204 then triangulates the user's location based on the signal strength data.

The location data does not have to be limited to cell-phone tower strength. Mobile devices can also record the raw satellite Global Positioning System (GPS) data or processed accurate longitude, latitude, elevation coordinates. Another example is using information about nearby Wi-Fi networks, radio tower signal strength, and so on to obtain the location information. In general, any type of data that can be used to compute the location of a mobile device would qualify. In addition, the communication mechanism between the mobile device and the location computation module (when the module is operating in the cloud) can be via any secure channel. For security reasons, in those implementations where the location computation module exists outside the device and computes a mobile device's location based on raw data provided from the device, this raw data is not cached or saved in any way.

Referring again to FIG. 2, a position processing module 206 receives a mobile device's location from the location computation module 204. The position processing module 206 then encrypts the location information as generally described previously and as will be described in more detail later in this description. Once a mobile device's location is encrypted, the unencrypted location data is deleted. Further, as will be described in more detail later, a position processing module 206 that is located outside the mobile device has the encryption key needed to encrypt a mobile device's location data, but it does not have the decryption key needed to decrypt that location once encrypted. Only the mobile devices 200 have the decryption key (hence, in situations where the position processing module 206 is located on the mobile device, the position processing module may have access to the decryption key, which may be identical to the encryption key).

Once the encrypted location information associated with the user's mobile device 200 (and so presumably associated with the user) is generated, it is then stored in a location database module 208. In one implementation, only the current encrypted location of a mobile device 200 is stored in the location database 208. Thus, in this implementation, each time new encrypted location information associated with a mobile device 200 is provided to the location database module 208 from the position processing module 206, any previously saved encrypted location information associated with the same mobile device 200 is deleted and just the new information is stored. However, in another implementation, the previously provided information and each new encrypted location information transmission are saved in the location database 208. This allows certain services to be provided that require knowledge of a mobile device's past locations, as will be described later in this description.

Figure 2:
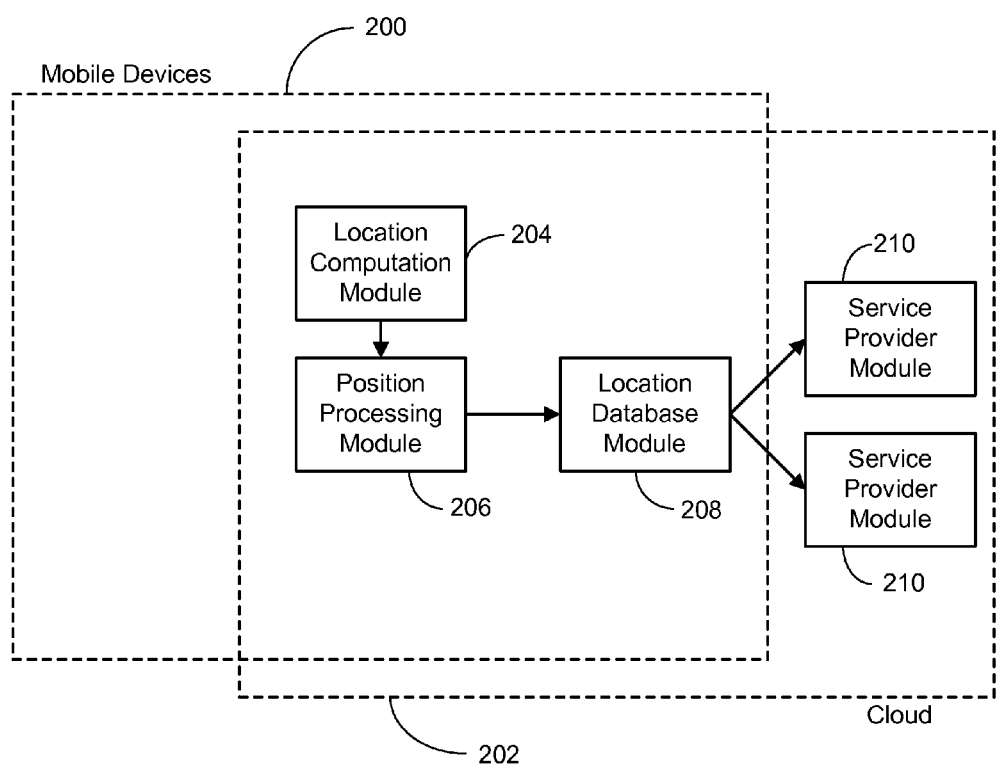
FIG. 2 is a simplified diagram of modules comprising a location-brokering platform.

The location computation module 204, position processing module 206 and location database module 208 can each reside in a user's mobile device 200 or in the cloud 202. The distribution of the location computation module, position processing module and location database between a user's mobile device (which is presumed to be a trusted device) and the presumably untrusted cloud depends on the degree of privacy the user desires. To ensure a greater degree of privacy, some or all of the location computation, position processing and location database modules would reside in a user's mobile device; maximum privacy is provided when all these modules reside on the user's mobile device. However, in order to conserve the mobile device's battery power, the location computation module, position processing module and location database module would reside in the cloud. Certain services can only be offered if the encrypted location information about a mobile device is available; hence, to offer these services, the location database module should either be located in the cloud, or the mobile device should make it constantly accessible. In one implementation, a user can move the location computation module, and/or position processing module, and/or location database module between the mobile device and the cloud on an ongoing basis to accommodate the user's current level of trust in the location brokering scheme. As indicated previously, the ability of the location computation module, position processing module and location database module to reside in any combination of a mobile device and the cloud is illustrated in FIG. 2 by the overlapping broken line boxes representing the mobile devices 200 and the cloud 202.

While the foregoing describes the location computation module, position processing module and location database module as potentially residing on a user's trusted mobile device, in one implementation there is an ancillary computing device involved. More particularly, any combination of these modules can be placed on ancillary mobile computing device which is in contact with the user's mobile device. In such an arrangement, the foregoing computing tasks associated with the mobile device would be accomplished by the ancillary computing device and the results transferred back to the mobile device or directly to the cloud. This paring is similar to the partnership between a conventional automobile and a cellular telephone. For the purposes of the following description, in implementations where an ancillary computing device is used, the combination of the mobile device and the ancillary device will simply be referred to as the mobile device.

In one implementation, the encrypted location information associated with multiple mobile devices participating in the location brokering scheme is stored in the location database, which resides in the cloud. As will be described in more detail later, having the encrypted location information of multiple mobile devices stored in the same location database facilitates providing certain services to the users.

With regard to the aforementioned services, users can contact various services running in the cloud to learn information about their location, as well as the location of other users. These services use the information stored in the location database module (or location database modules if the encrypted location information associated with one or more of the participating mobile devices resides in the mobile device itself or an ancillary computing device as described previously) to provide this location information. In addition, services can monitor the location database module (or modules) and push location information to users when appropriate. To this end, referring to FIG. 2 once again, one or more service provider modules 210 (two of which are shown) are also part of the operating environment. A service provider module 210 is also tasked with access control to determine if a querying user or application has the proper authorization to access the requested location information. It is noted that the type of location information a service provider module 210 can provide is limited for security reasons to that which can be ascertained from the encrypted location information stored in the location database module 208, as the service provider will not possess the decryption key needed to decrypt the data. As long as the service provider module does not collude with mobile device(s) that own the decryption keys, the privacy of users who store their data is assured. Hence, the user gets a guaranteed coarse level of access control by deciding which mobile device owner(s) get copies of the decryption key, and an additional finer level of access control by delegating access decisions to the service provider.

1.2 Location Data Encryption and Storage

In order to ensure privacy and security for a mobile device user's location while still providing useful location-based services, the location brokering technique embodiments described herein employ location data encryption and storage techniques. This section describes those techniques in more detail.

Each mobile device includes a device datastore for storing data used in the location encryption technique. More particularly, the following information is stored in the device datastore:

1) User Identifier. This is an identifier associated with the user or the user's mobile device; and 2) Keys (PKG, SKG, RG). For each group to which the user belongs, the device datastore stores the group's public and secret key (PKG, SKG) to a public key encryption scheme (such as the Rivest, Shamir and Adleman (RSA) encryption scheme or El Gamal). In addition, the device datastore stores the group's shared secret key RG, which is a key to a pseudorandom function (e.g., the Advanced Encryption Standard (AES) function). Alternatively, in situations where the position processing module is located on the mobile device or an auxiliary computation device, PKG may equal SKG, and be the secret key to a symmetric encryption scheme (such as AES). For the purposes of the descriptions to follow, anytime the use of a group public key PKG and a public key encryption scheme is specified, it is understood that in the case where the position processing module is located on the mobile device (or an auxiliary device), a secret key SKG can be used in place of the group public key PKG and a symmetric encryption scheme can be used in place of the public encryption scheme. Further, the mobile device may, instead of storing (PKG, SKG, RG) explicitly, store some value (SV) that allows it to deterministically compute (PKG, SKG, RG) as needed.

Figure 3A:
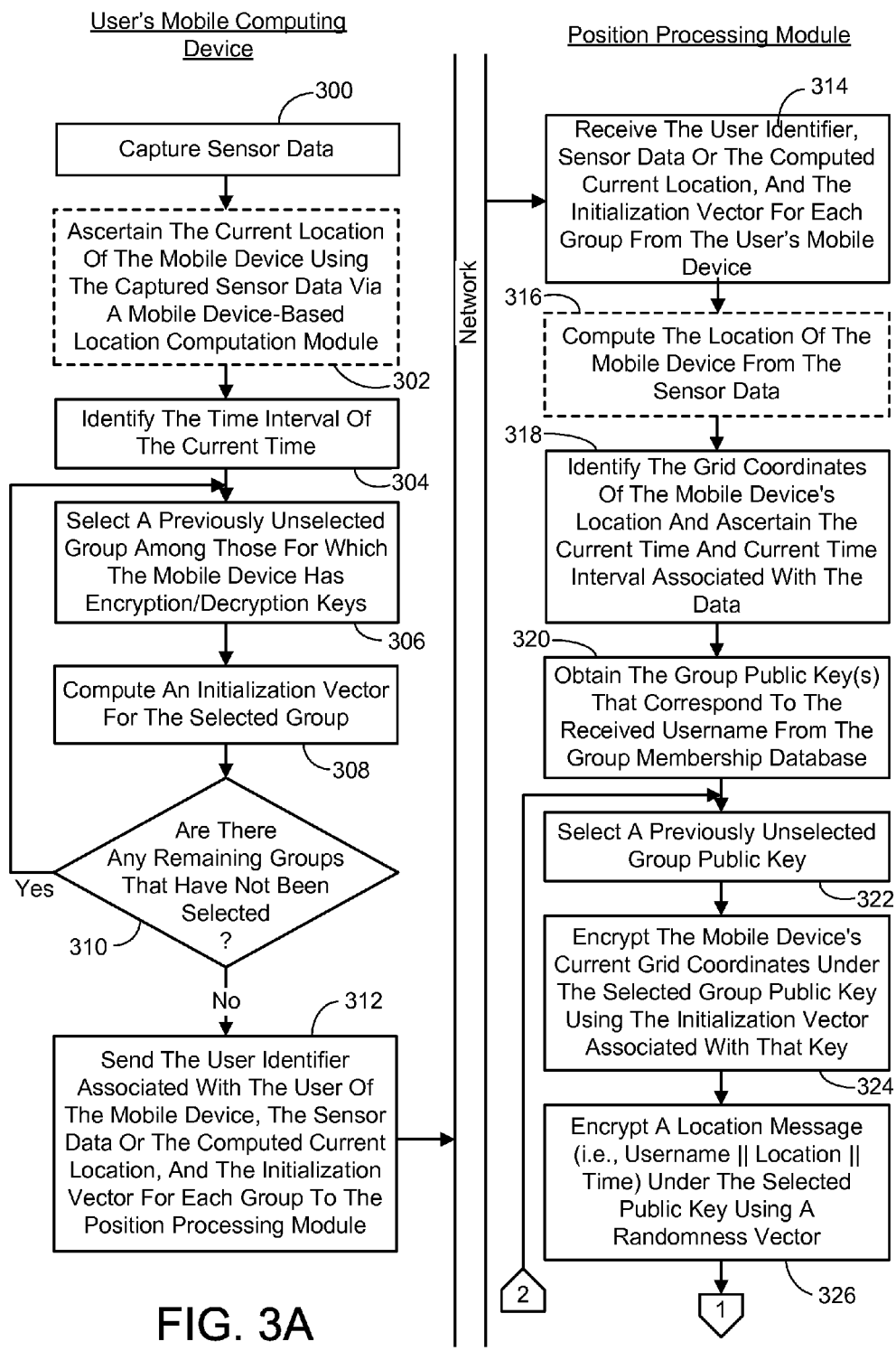
FIGS. 3A-B are a continuing flow diagram generally outlining an implementation of the part of the process of FIG. 1 involving location data encryption and storage.
Figure 3B:
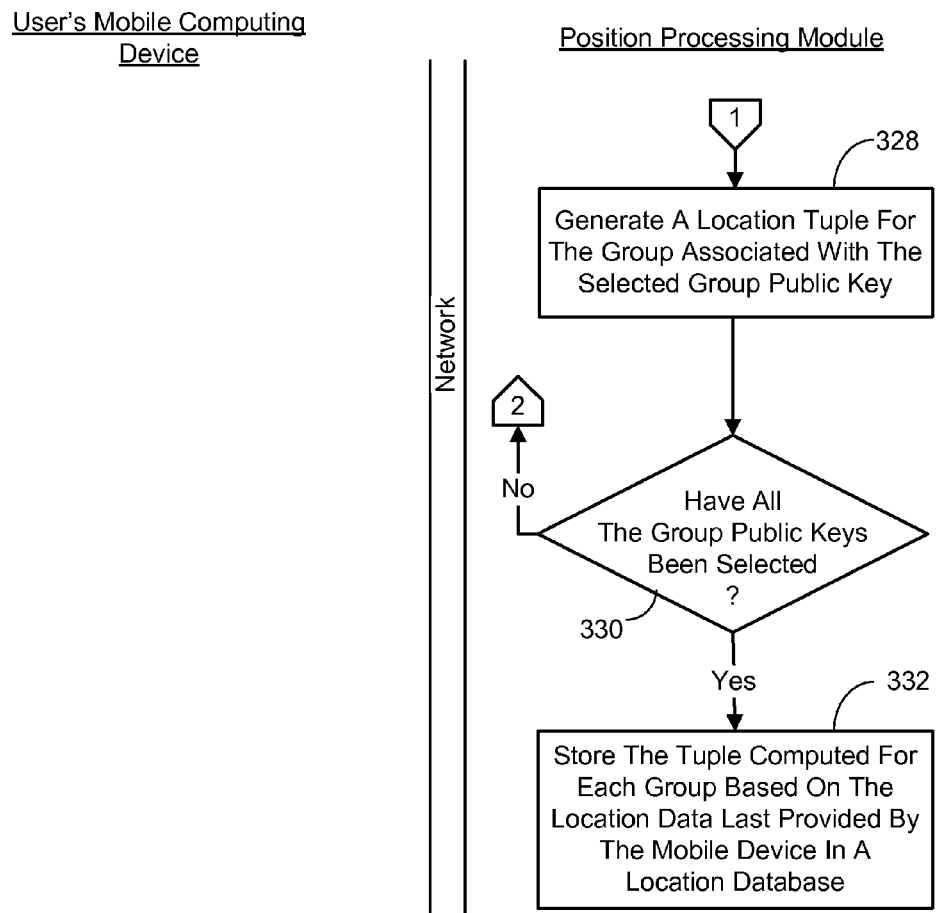

In one implementation, location data encryption and storage is accomplished in the following manner. Referring to FIGS. 3A-B, a mobile device captures raw data regarding its current location (300), and this data is contingently processed to ascertain the current location of the mobile device via a mobile device-based location computation module (302). This last action is contingent (as indicated by the broken line box in FIG. 3A) as the raw data could instead be sent to the position processing module for further forwarding to a location computation module that is residing in the cloud. Next, the mobile device identifies a time interval T of the current time (304). It is noted that time is divided into prescribed-length intervals (e.g., 15 minutes, one hour, or one day) and the current time interval is known by each mobile device, as well as the position processing module. Suppose there are P groups in the mobile device datastore. The mobile device then selects a previously unselected group (p) among those for which the mobile device has keys (PKG(p), SKG(p), RG(p)) stored in its device datastore (306), and the mobile device computes an initialization vector (IV) for the selected group (308). In one implementation, each initialization vector is computed as $$IV[p]=PRF[RG[p],T], \quad (1)$$

where the function PRF is the aforementioned pseudorandom function. The mobile device then determines if there are any remaining groups that have not been selected (310). If there are, then actions 306 through 310 are repeated.

When an initialization vector has been computed for each of the aforementioned groups, the mobile device then sends the username associated with the user of the mobile device, the raw sensor data or the computed current location as the case may be, and the initialization vector for each group $IV[1], \ldots, IV[P]$ to the position processing module (312). In one implementation, each mobile device provides the aforementioned information to the position processing module once during each time interval. However, it may do so more or less frequently.

The position processing module processes the information it receives from a mobile device, and then stores it in the location database. Specifically, the position processing module receives the username, raw sensor data or computed current location, and the initialization vector for each group that the mobile device sent (314). If raw location data is sent, the position processing module computes the location of the mobile device from the data via a location computation module (316). Here again, the contingent nature of this last action is represented by the use of a dashed line box in FIG. 3. The position processing module then identifies the grid coordinates L of the mobile device's location and ascertains the current time T and current time interval TI associated with the data (318) if any of these values have not been sent as part of the input from the mobile device.

In one implementation, a group membership database is maintained by the location data engine in the cloud. This database stores information as to which user is a member of which group. The storage scheme can be anything appropriate (e.g., relational database, flat file, and so on). For example, the group membership database can be a table of rows, where the $i^{th}$ row contains the following values:

1) U[i]. The username of the $i^{th}$ user; and

2) PKG[i, 1] ... PKG[i, P]. The group public key of all the groups to which user U[i] belongs. As indicated previously, these are public keys for a public key encryption scheme such as RSA or El Gamal.

The group membership database is only necessary if the position processing module resides in the cloud. If the position processing service resides on the mobile device (or auxiliary computation device), the position processing service only needs the group public keys $PKG(1), \ldots, PKG(P)$ that are in the mobile device data store in order to perform its function.

It is noted that there may also be a group membership service that allows users to modify the information in the group membership database and distribute keys to the appropriate devices' datastores. The exact mechanism behind the group membership service is beyond the scope of this work, but it is straightforward to implement using standard techniques. It is also noted that in an alternate implementation, the group membership database resides on the mobile device of a user.

The position processing module has access to the group membership database. Referring to FIG. 3A, in operation, the position processing module obtains the group public key PKG[1] or group public keys PKG[1], ..., PKG[P] (if there are more than one), which correspond to the username received from the mobile device, from the group membership database (320). If the position processing module is on the mobile device, it uses the group keys PKG[1] ... PKG[P] in the device datastore that belong to the user. If there is more than one key, the position processing module associates each group public key PKG[p] with the initialization vector IV[p] received from the mobile device that was generated for that key. Any appropriate method of keeping track of which initialization vector was generated for which public key can be employed (e.g., such as sending each IV[p] in the lexicographical order of the PKG[p]s).

The position processing module now has the username (U) of the user of the mobile device, the mobile device's location, the grid coordinate (L) of the mobile device's location, current time and the current time interval (TI) associated with the data received from the mobile device. In addition, the position processing module has the group public key PKG[p] and corresponding initialization vector IV[p] for each group having the user of the mobile device as a member. Given this data, in one implementation, the position processing module computes a tuple (PKG[p], U, TI[p], EL[p], EP[p]) for each group (i.e., for each value p in 1 . . . P). In the foregoing tuple, $$EL[p]=\text{Encrypt}(PKG[p],L;IV[p]), \quad (2)$$

where the "Encrypt" function is the encryption function of a public key encryption scheme (such as RSA or El Gamal), that encrypts the mobile device's current grid location L under group public key PKG[p] using the initialization vector IV[p] as the sole source randomness. Alternatively, if the position processing module is located on the mobile device, then the "Encrypt" function may instead be the encryption function of a symmetric key encryption scheme (such as AES), that encrypts the mobile device's current grid location L under a symmetric key PKG[p]=SKG[p] using the initialization vector IV[p] as the sole source of randomness. Additional information may be encrypted along with L as part of EL. However, this information must be identically computed (and computable) by all mobile devices in the same group.

Further, in the foregoing tuple, $$EP[p]=\text{Encrypt}(PKG[p],\text{user identifier}\|\text{location}\|\text{time}; \text{rand}[p]), \quad (3)$$

where the "Encrypt" function is a public key encryption scheme (such as RSA or El Gamal), that encrypts a location message (user identifier∥location∥time) under group public key PKG[p] using a randomness vector rand[p] for randomness. Alternatively, if the position processing module is located on the mobile device, then the "Encrypt" function may instead be the encryption function of a symmetric key encryption scheme (such as AES), that encrypts a location message (user identifier∥location∥time) under a symmetric key PKG[p]=SKG[p] using a randomness vector rand[p] for randomness. Optionally, the user identifier and/or time may be omitted from the location message. The user identifier can be omitted if it is associated with the location message and provided separately. The time can be omitted if it is assumed that the location message is applicable to the current time interval. A different randomness vector rand[p] is generated by the position processing module for each execution of the Encrypt function. Additional information may be added to the location message beyond what is mentioned here.

In view of the foregoing and referring once again to FIGS. 3A-B, the position processing module next selects a previously unselected group public key from the obtained set (322). It then encrypts the mobile device's current grid coordinates under the selected group public key using the initialization vector associated with that key (324), and encrypts the location message under the selected public key using the randomness vector rand[p] (326), in the manner described above. Next, the position processing module generates the location tuple (i.e., G[p], U, TI[p], EL[p], EP[p]) for the group associated with the selected group public key (328). The position processing module then determines if all the group public keys have been selected (330). If not, then actions 322 through 330 are repeated until all the keys in the set of obtained group public keys are selected and processed. Once all the group public keys have been processed as described above, the position processing module takes the tuple (G[p], U, TI[p], EL[p], EP[p]) computed for each group based on the location data last provided by the mobile device, and stores them to the location database (332). The storage scheme can be anything appropriate (e.g., relational database, flat file, and so on). For example, the location database can be a table of rows, where the $i^{th}$ row contains the following values:

1) G[i]. This is an identifier of the group (may be equal to PKG[i]), that indicates that the data in row i belongs to a member of group G[i], and that EL[i] and EP[i] are encrypted under public key PKG[i] associated with G[i];

2) U[i]. This is a username associated with a user, indicating that row i contains data about the location of the user's mobile device;

3) TI[i]. This designates a particular time interval and indicates that the location data in row i was recorded during this time interval;

4) EL[i]. This is a location token in the form of an encryption of grid coordinates as described previously; and 5) EP[i]. This is the encrypted location message in the form of an encryption of the user identifier U[i], a location of a mobile device associated with the username, and the time the mobile device associated with the username was at that location.

The values G[i], U[i], and TI[i] are only needed to enhance performance and allow the service provider modules to perform certain access control decisions described later. Optionally, any of these three values may be omitted from the database. If U[i] is omitted, then username should be part of the location message. Other data may be stored in the row as well.

The encrypted location data stored in the location database can be used to let users know if they are geographically close to a member of a group that they also belong to, as well as for other location brokering services. These types of services will be described in the sections to follow. However, since a mobile device's grid location is used to represent the device's actual location, it is possible that users from the same group could be geographically close to each other, but on different sides of an arbitrary grid line. Thus, their encrypted location information would not indicate they are close. While this may not occur frequently, in one implementation, the situation is precluded by generating encrypted user location information not only for the grid coordinates of the grid cell where the mobile phone is located, but also for the grid coordinates of adjacent grid cells. For example, if a rectangular grid scheme is employed, there would be nine grid cells involved—namely the grid cell in which the mobile device's location falls and the eight adjacent grid cells. The foregoing is accomplished by having the position processing module compute an "EL" for the grid coordinates of the mobile device's location and those of the adjacent grid cells. More particularly, the position processing module would compute:

$$EL[p][i]=\text{Encrypt}(PKG[p],L[i];IV[p]), \quad (4)$$

where L[i] is the coordinates of either the grid cell containing the mobile device, or one of the adjacent surrounding grid cells. All of the EL[p][i] values are then included in the tuple generated by the position processing module.

In an alternate implementation, rather than computing EL values for multiple grid cells, it is possible to dynamically change the grid cell placements by periodically shifting the location grid, and/or redefining the cell boundaries over time. In this way, users who are relatively close to each other in adjacent grid cells at one point in time would be in the same grid cell at another point in time, even though they have not changed location. The grid placement and cell boundaries can be randomly modified or changed in a prescribed manner according to particular application or user requirements, using conventional methods.

1.3 Proximity Detection Services

As indicated previously, one of the types of services that can be provided using the encrypted location information in the location database is to let users know if they are geographically close to a member of a group or a previously identified landmark to which they also belong. For example, a proximity detection service could tell a user who is enrolled in a particular university if a fellow university student is nearby.

These types of services can be referred to as proximity detection services and they run in the cloud. The proximity detection services either respond to proximity requests (a pull model) or actively push proximity information to appropriate users or applications (a push model). Both models will now be described in more detail.

1.3.1 Pull Rendezvous Service

The pull rendezvous service is a pull-model proximity detection service where users query the service to find out if any mobile device users belonging to a same group as the querying user are nearby. In general, the pull rendezvous service searches the location database for any matches and sends the results back to the querying user. The pull rendezvous service only sends information about users that are members of the same group and who are near the querying user in the current time interval. The user then decrypts the returned information to learn the actual locations of nearby group members.

Figure 4A:
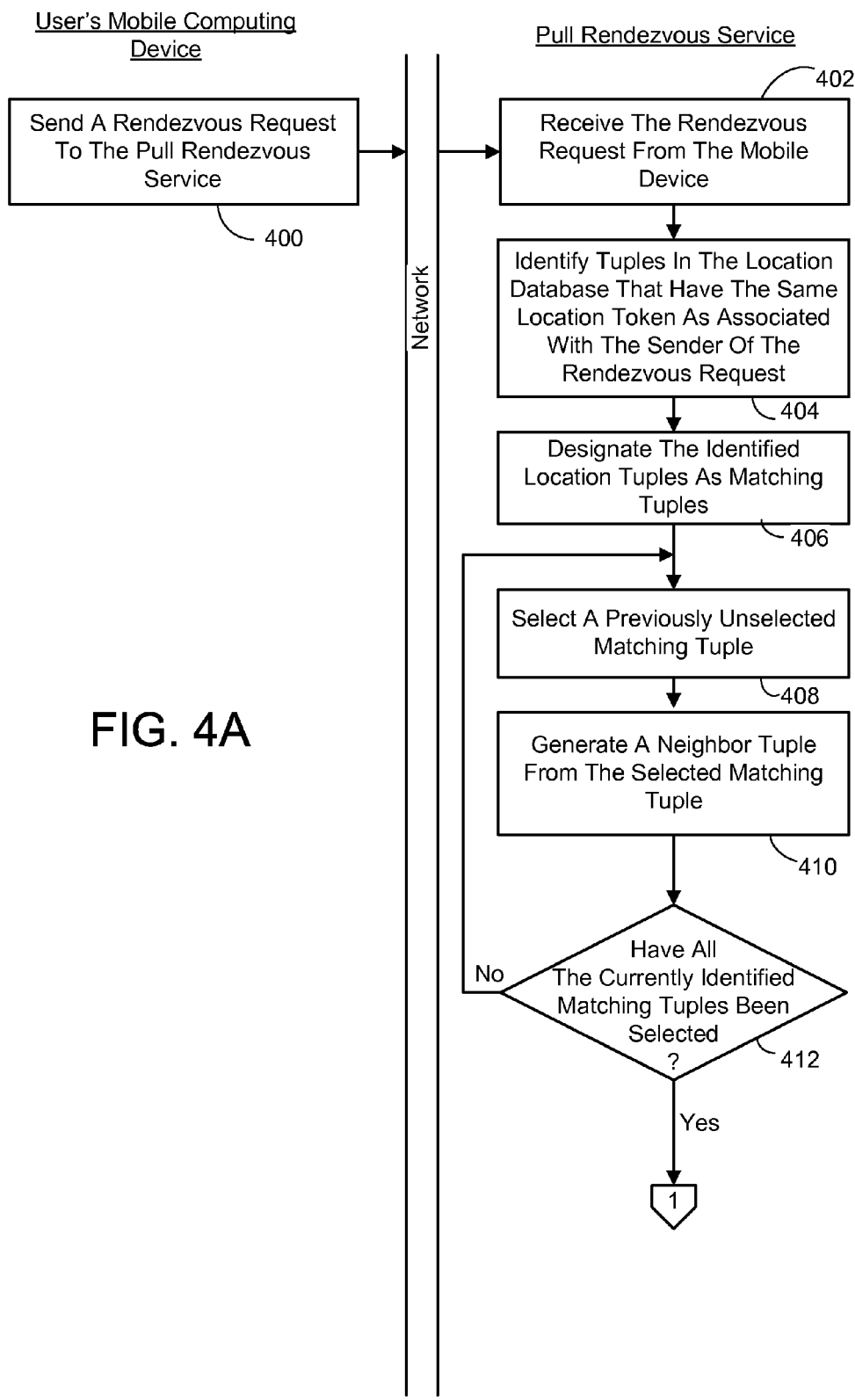
FIGS. 4A-B are a continuing flow diagram generally outlining an implementation of the part of the process of FIG. 1 involving a pull rendezvous location service.
Figure 4B:
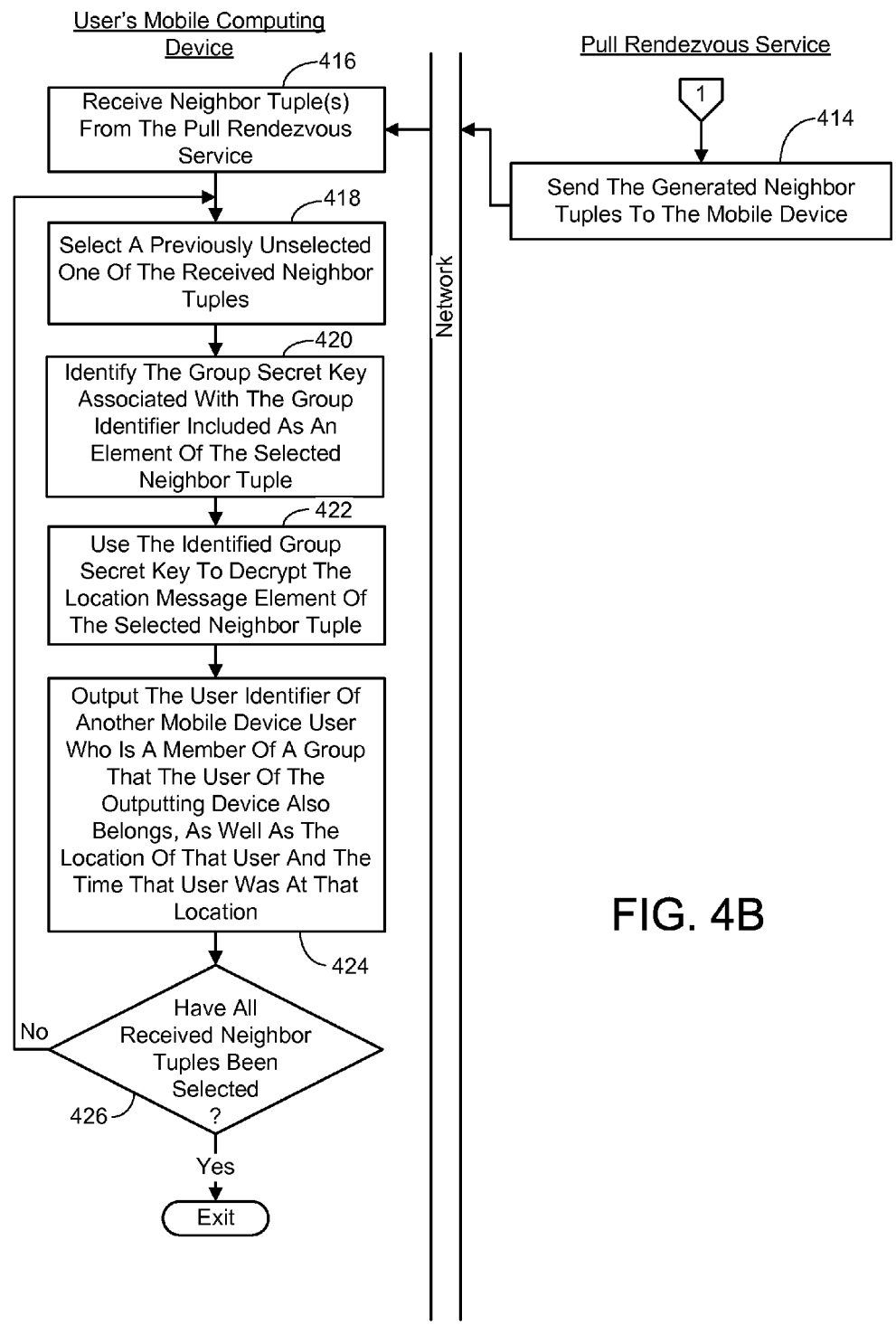

In one implementation, the pull rendezvous service performs the foregoing task in the following manner. Referring to FIGS. 4A-B, a mobile device in the possession of a user who wants to know the location of other mobile device users belonging to a same group as the querying user and who are nearby, sends a rendezvous request to the pull rendezvous service (400). A mobile device user labeled "nearby" can be within the same grid cell as the querying user, or within the same grid cell or one of the adjacent grid cells, depending on which of the previously described grid cell location options is employed. In addition, it is assumed that the querying user's mobile device has provided location information to the position processing module within the current time interval. If not, this location information is provided prior to making the rendezvous request or along with the request. It is further noted that the rendezvous request includes any authenticating information (e.g., a user identifier and password) that is required by the pull rendezvous service to grant the request. The particular authenticating scheme employed can be any appropriate conventional scheme.

The pull rendezvous service receives the rendezvous request from the mobile device (402) and identifies tuples in the location database that have the same location token EL as associated with the sender of the rendezvous request (404). The identified location tuples are then designated as matching tuples (406). In one implementation, the location token of the requesting user is provided in the rendezvous request. In another implementation applicable to cases where the stored locations tuples include the user identifier and time interval, the requesting user's location token EL can be looked up in the location database by finding an entry with the requesting user's user identifier and a TI equal to the current time interval. In one implementation (not shown in FIGS. 4A-B), the pull rendezvous service may also filter the identified tuples prior to designating them as matching tuples to remove some unwanted tuples. For example, this might be done if the identified tuple belongs to the requesting user, or for some other access control decision it makes from other values associated with the tuple. In the case where there are multiple location tokens in the tuple representing the encrypted grid coordinates of the grid cell where the querying user is located and the adjacent grid cells, it is deemed that a tuple has the same location token as the selected tuple if any one of the location tokens is the same as the location token representing the encrypted grid coordinates of the grid cell where the querying user is located. In one implementation, the location token representing the encrypted grid coordinates of the grid cell where the querying user is located is the first listed location token in a tuple having multiple location tokens. It is further noted that if the requesting user's location token matches the location token in a stored location tuple, then there is a high probability that the mobile device associated with the matching tuple is currently in the same grid cell as the requesting user. In addition, the requesting user will only be able to decrypt the encrypted location message from the matching tuple if he or she is a member of the same group (and so has the proper group decryption key). In this way security is maintained even without performing a group identifier and time interval equality check. However, in an alternate implementation (not shown in FIGS. 4A-B), where a user identifier, group identifier and a time interval are included in the stored location tuples, the pull rendezvous service looks up the requesting user's location token in the location database by finding an entry with the requesting user's user identifier and the current time interval, finds location tuples having the same location token, and then checks that the requesting user is a member the same group (via the group identifier) as a discovered tuple, before designating that tuple to be a matching tuple.

Referring again to FIGS. 4A-B, a previously unselected matching tuple is selected (408) and the pull rendezvous service generates a neighbor tuple from the selected matching tuple (410). A neighbor tuple includes at least the previously described encrypted location message from the selected matching tuple, and can optionally include the aforementioned group identifier (if included in the selected matching tuple). As described previously, the encrypted location message is an encryption of the location of a mobile device, and optionally the user identifier associated with the mobile device, and optionally the time that location was captured. It is then determined if all the currently identified matching tuples have been selected (412). If not, actions 408 through 412 are repeated until a neighbor tuple has been generated for each of the matching tuples. When all the identified tuples have been considered, the pull rendezvous service sends the generated neighbor tuples (if any) to the mobile device (414).

The mobile device receives a set of one or more neighbor tuples from the pull rendezvous service (416) (assuming there are any) and selects a previously unselected one of the received neighbor tuples (418). The mobile device then identifies the group secret key associated with the group identifier, which is included in the neighbor tuple in the exemplary implementation shown in FIGS. 4A-B (420). In implementations where no group identifier is included in the neighbor tuple, the mobile device will try each possible group secret key SKG in the device's datastore. As described previously, the group public key (if required), group secret key and shared key (PKG, SKG, RG) associated with each group to which the mobile device's user belongs is stored in the device's datastore. The identified group secret key is then used to decrypt the aforementioned location message element of the selected neighbor tuple (422). More particularly, the mobile device computes:

$$\text{user identifier}\|\text{location}\|\text{time} = \text{Decrypt}(SKG, EP) \quad (5)$$

where the "Decrypt" function is the decryption function from the public key encryption scheme used to encrypt the location message (such as RSA or El Gamal), and which is decryptable using the group secret key (SKG). Here again note that the user identifier and/or the time elements may be omitted in the decrypted location message.

Once the location message is decrypted, the mobile device outputs to its user via conventional methods (e.g., using a display screen), the user identifier of the mobile device user who is a member of a group that the user of the outputting device also belongs, as well as the location of that user and the time that user was at that location (424). If any of this information was omitted in the neighbor tuple or decrypted location message, it is otherwise obtained or surmised. It is noted that any appropriate conventional method of indicating the location of the other user can be employed.

It is then determined if all the neighbor tuples received from the pull rendezvous service have been selected (426). If not, then actions 418 through 426 are repeated. If all the received neighbor tuples have been processed as described above, then the procedure ends.

In the foregoing procedure, if the location database resides in the mobile device and not the cloud along with the pull rendezvous service, then the pull rendezvous service requests information it needs from this database via the mobile device.

1.3.2 Push Rendezvous Service

The push rendezvous service is a push-model proximity detection service where, in general, the location database is monitored, and whenever two users who are members of the same group are near each other during the current time interval; it sends them a notification along with encrypted information about each other's location. The users can then decrypt the information with their group secret key and learn the location of a nearby group member.

Figure 5A:
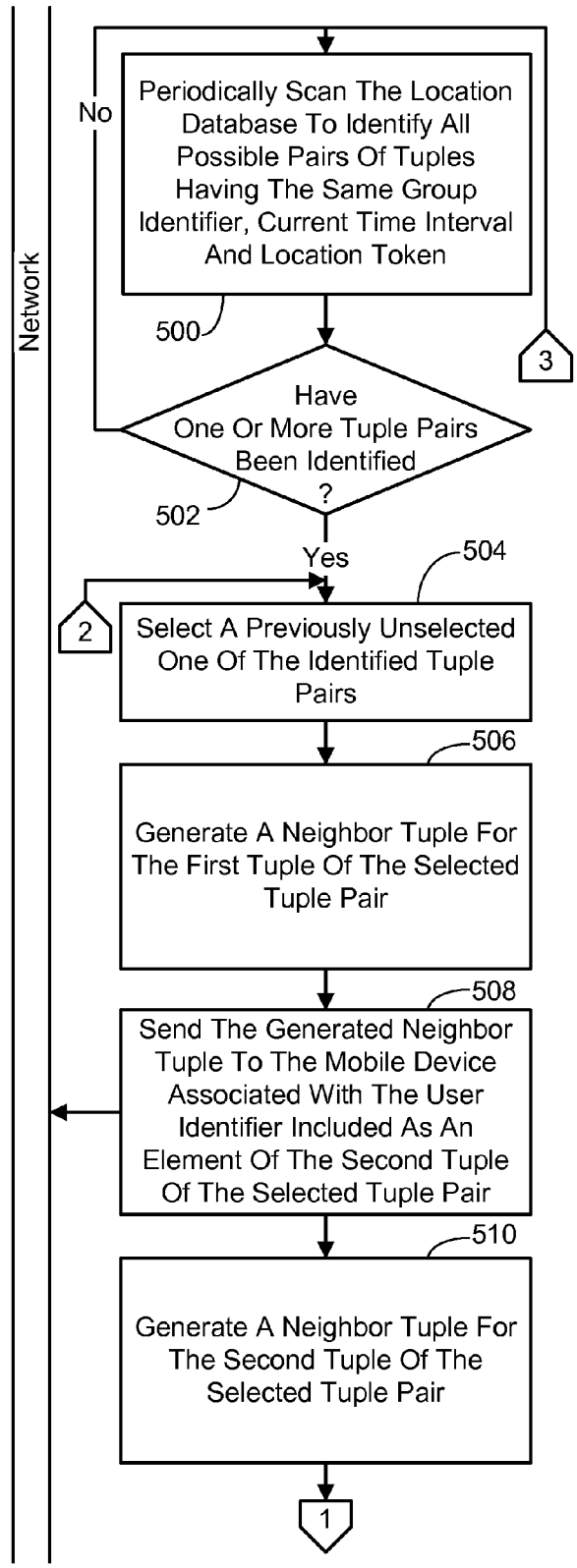
FIGS. 5A-B are a continuing flow diagram generally outlining an implementation of the part of the process of FIG. 1 involving a push rendezvous location service.
Figure 5B:
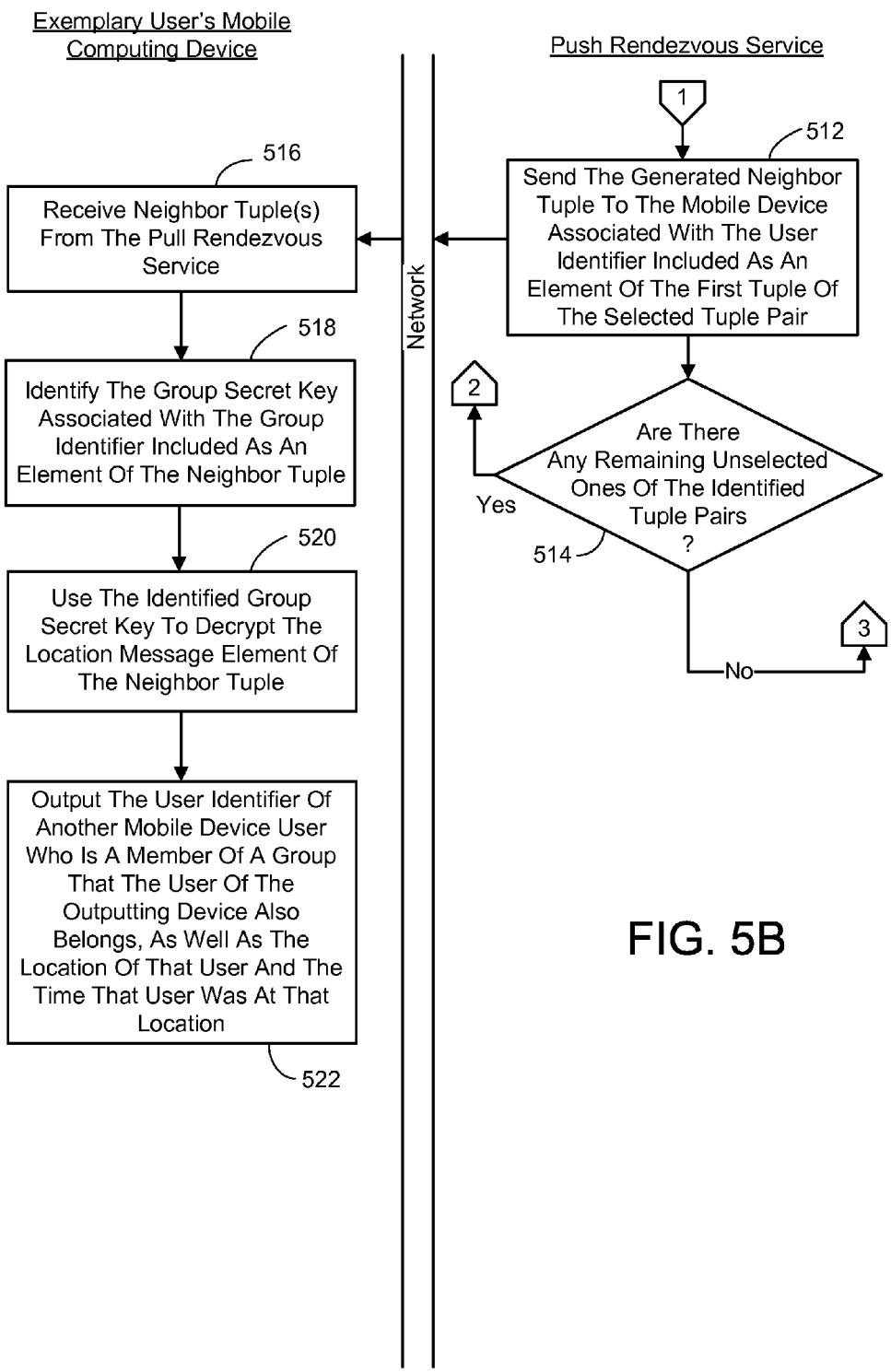

In one implementation, the push rendezvous service performs the foregoing task in the following manner. Referring to FIGS. 5A-B, the push rendezvous service periodically (e.g., every time interval) scans the location database to identify all possible pairs of tuples having the same group identifier, current time interval, and location token (500). The foregoing implementation assumes the locations tuples include all these elements. However, in an alternate implementation, the group identifier comparison could be omitted as will be explained shortly. As such, this alternate implementation does not require the group identifier to be included in the location tuples. In implementations where the tuples have multiple location tokens representing the encrypted grid coordinates of not only the grid cell where the associated mobile device is located but also the adjacent surrounding cells as well, determining if a pair of tuples has the same location token is more complicated. In this setting, the push rendezvous service determines if the location token of a first tuple of the pair that corresponds to the encrypted grid coordinates of the grid cell where the associated mobile device is located matches any of the location tokens in the second tuple of the pair. If it does, then the encrypted grid coordinates of the tuple pair match. It does not matter which tuple in the tuple pair is deemed the first tuple.

After each scan of the location database, it is determined if one or more tuple pairs were identified (502). If not, then the monitoring continues by repeating actions 500 and 502. When it is determined that one or more tuple pairs are identified, a previously unselected one of the identified pairs is selected (504). The push rendezvous service then generates a neighbor tuple for the first tuple of the selected tuple pair (506), and sends it to the mobile device associated with the user identifier included as an element of the second tuple of the selected tuple pair (508). The neighbor tuple includes at least the previously described encrypted location message from the first tuple of the selected pair, and can optionally include the aforementioned group identifier (if included in the first tuple). Likewise, the push rendezvous service generates a neighbor tuple for the second tuple of the selected tuple pair (510), and sends it to the mobile device associated with the user identifier included as an element of the first tuple of the selected tuple pair (512). This neighbor tuple includes at least the previously described encrypted location message from the second tuple of the selected pair, and can optionally include the aforementioned group identifier (if included in the second tuple). It is then determined if there are any remaining unselected ones of the identified tuple pairs (514). If so, actions 504 through 514 are repeated. If not, then the procedure continues starting again with action 500.

As shown in FIGS. 5A-B by the exemplary user's mobile computing device, whenever a mobile device receives a neighbor tuple from the push rendezvous service (516), it identifies the group secret key associated with the group identifier included as an element of the neighbor tuple (518). Note that in the exemplary implementation of FIGS. 5A-B, the group identifier is included in the neighbor tuple (and so was available in the location tuples). In implementations where the group identifier is not included in the neighbor tuple, the mobile device tries every possible group secret key in the device's datastore. If the group identifier was included in the location tuples, and the tuple pair under consideration was identified in part because their group identifiers matched, then the proper group secret key will be found in the mobile device's datastore. However, if the tuple pair under consideration was identified without matching the group identifiers, then it is possible that the mobile device will not have the proper group secret key needed to decrypt the location message provided in a neighbor tuple because the user of the mobile device does not belong to the same group as the user associated with the location message. The identified group secret key is then used to decrypt the aforementioned location message element of the neighbor tuple (520). More particularly, previously described Eq. (5) is employed to decrypt the location message. Once the location message is decrypted, the mobile device outputs to its user via conventional methods (e.g., using a display screen), the user identifier of another mobile device user who is a member of a group that the user of the outputting device also belongs, as well as the location of that user and the time that user was at that location (522). If any of this information was omitted in the neighbor tuple or decrypted location message, it is otherwise obtained or surmised.

As with the pull rendezvous service, if the location database resides in the mobile device and not the cloud along with the push rendezvous service, then the push rendezvous service requests information it needs from this database via the mobile device. Further, that in any communications between the cloud and a mobile device, the method of communication employed is either a default method, or the method specified by the mobile device.

As is evident from the description of the foregoing implementation of the push rendezvous service, each time a neighbor tuple is generated, it is sent to the appropriate mobile device. However, in an alternate implementation, any neighbor tuples that are generated for a user of a mobile device are saved and periodically sent as a batch. For example, such a batch message might be sent every 15 minutes or every hour, assuming there is at least one neighbor tuple to be delivered.

1.4 Other Location Brokering Services

In addition to the proximity detection services described above, the location brokering technique embodiments described herein can support other location-related queries from users or applications. For example, the technique can support queries to find members of a group who are near a certain area, or who were in a certain location in the past, or where a certain user was located at a certain time interval, and so on, can be supported. The following section will describe how these queries are generated and sent to a cloud-based location brokering service, as well as the procedure the service employs to respond to this query. It is noted that due to privacy concerns with these types of location-based queries, in one implementation, the procedure the service employs to respond considers user-specified, individualized privacy policies that are enforced when answering queries.

1.4.1 Generating a Location Information Query

In general, a mobile device or cloud application generates a location information query that is sent to the location data engine in the cloud for answering, along with conventional authentication credentials used to determine if a user is authorized to submit queries. This query includes one or more elements that define what the querying user is interested in discovering. For example, in one implementation these elements include the group, the user identifier of another user, the time interval (past or present), and a location (in the form of the previously described location token). The querying user includes specifics about any of the elements that he or she wants to limit and does not provide specifics if the query involves all instances of that element. For example, if the querying user is interested in knowing the location of members of a particular group but does not want to limit the answer to a particular user, time, or location, then the query would simply specify the group. Likewise, if a querying user wanted to know when any user in any group was located at a particular location, then the query would specify the location (in the form of a location token), but not the group, user identifier or time. These are examples where only one of the elements is limited. Examples where two elements are limited might involve a querying user wanting to know the location of members of a specific group at a particular time interval. Thus, the querying user would specify the group and time interval, but not the user identifier or location. An example of a query where three of the elements are limited could involve a querying user wanting to know if a member of a specific group is at a particular location in the current time interval. In this example, the querying user would specify the group, location (in the form of a location token) and the current time period, but not the user identifier. It is even possible a querying user might want to obtain location information that requires limiting all the elements. For example, consider where a querying user wants to know if a particular user who is a member of a particular group was at a particular location at a particular time. In such a case the query would specify the group, user identifier, location (in the form of a location token), and time interval. The foregoing are only examples of the many queries that can be generated by limiting one or more of the aforementioned elements—many more are possible. In addition, the limitations placed on an element need not be one-dimensional. For instance, rather than specifying a particular time interval, a querying user might specify a range of time periods (e.g., in the current and past ten time intervals, in time intervals falling between 9 AM and 5 PM, and so on). These multi-dimensional types of limitations can be employed when specifying groups, user identifiers, and locations as well.

1.4.2 Privacy Policies

While a querying user who has authorization to submit queries might ask for certain information about other users, a user may not want the service provider to release this information. As mentioned previously, this situation is handled in one implementation by employing individualized privacy policies that would be enforced when answering queries. In general, a user would construct a privacy policy statement that is sent to and stored in a privacy policy database. The statement can be sent using the user's mobile device, but this need not be the case. The statement could be constructed on and sent from any computing device, as long as the user of the device proves to the location service that the user is authorized to modify the privacy policy of the target user. The location data engine would obtain a user's privacy policy statement from the privacy policy database and use it in determining whether to answer a particular query concerning the user. The privacy policy database can be located on a user's mobile device (in which case it would only contain the user's statement), or it can be located in the cloud (in which case it would contain the privacy policy statements of multiple users), or both. If the privacy policy database resides on a user's mobile device, the service provider would obtain the user's statement by communication with the mobile device in a manner similar to that described when the position processing module and/or location database was located on a user's mobile device, and with the same higher power demands on the mobile device.

A user constructs a privacy policy statement by specifying one or more elements that define what information the user wants to restrict. Some of the elements are included to ensure the policy statement is specific to a group and timely. For example, in one implementation, the privacy policy statement elements include the group to which the user belongs. The user specifies a group such that the privacy policy applies to only that group. If the user belongs to multiple groups, a separate privacy policy statement can be constructed for each one. If the privacy policy omits a particular group, then a default privacy policy would apply to members of that group.

Other elements in the privacy policy statement are intended to limit the location information that can be obtained about a user. However, if a user does not place a limitation on such an element, then all queries involving that element would be responded to—assuming another element does not restrict its release. For example, in one implementation these elements include the user identifier of a querying user and a group to which the querying user belongs. If a user specifies one or more users, only queries from these users would be answered. Likewise, if a user specifies one or more querying user groups, only queries from users who are a member of at least one of the specified groups would be answered. Another limiting element is the time interval for which querying user wants to know location data. A user can use this element to specify particular time intervals that information can be revealed (and so not reveled for all other time intervals). For example, the user might specify just the current time interval, or the time intervals between 9 AM and 5 PM, or time intervals within the past week, and so on. Yet another limiting element is the encrypted grid location of querying user. This element allows a user to specify location information is only to be revealed to a querying user if they are in a specified location. For example, a user could specify that location information is only to be released if the querying user is located in the same grid cell as the user. Still another limiting element is the encrypted grid location of user who generated the privacy policy statement. This element allows a user to specify location information is only to be revealed to a querying user if the user is in a specified location. For example, a user could specify that location information is only to be released if the user is located at or near his or her workplace (as represented by the encrypted grid coordinates of the grid cell where the user's workplace is located).

Combining the foregoing limiting elements allows a user to construct a wide variety of privacy policies. For example, a user can construct a policy where location information is revealed only if the querying user is currently nearby. This can be done by using the encrypted grid location of the querying user element to specify the querying user must be in the same grid cell as the user (i.e., the location tokens of the querying user and the user constructing the privacy policy statement must match), and using the time interval element to specify information can only be revealed if requested in the current time interval. In addition, as with the elements of the location query, the limitations placed on an element need not be one-dimensional. For instance, rather than specifying a particular time interval for which location information can be revealed, a user might specify a range of time periods (e.g., in the current and past ten time intervals, in time intervals falling between 9 AM and 5 PM, and so on).

1.4.3 Handling a Location Information Query

Figure 6A:
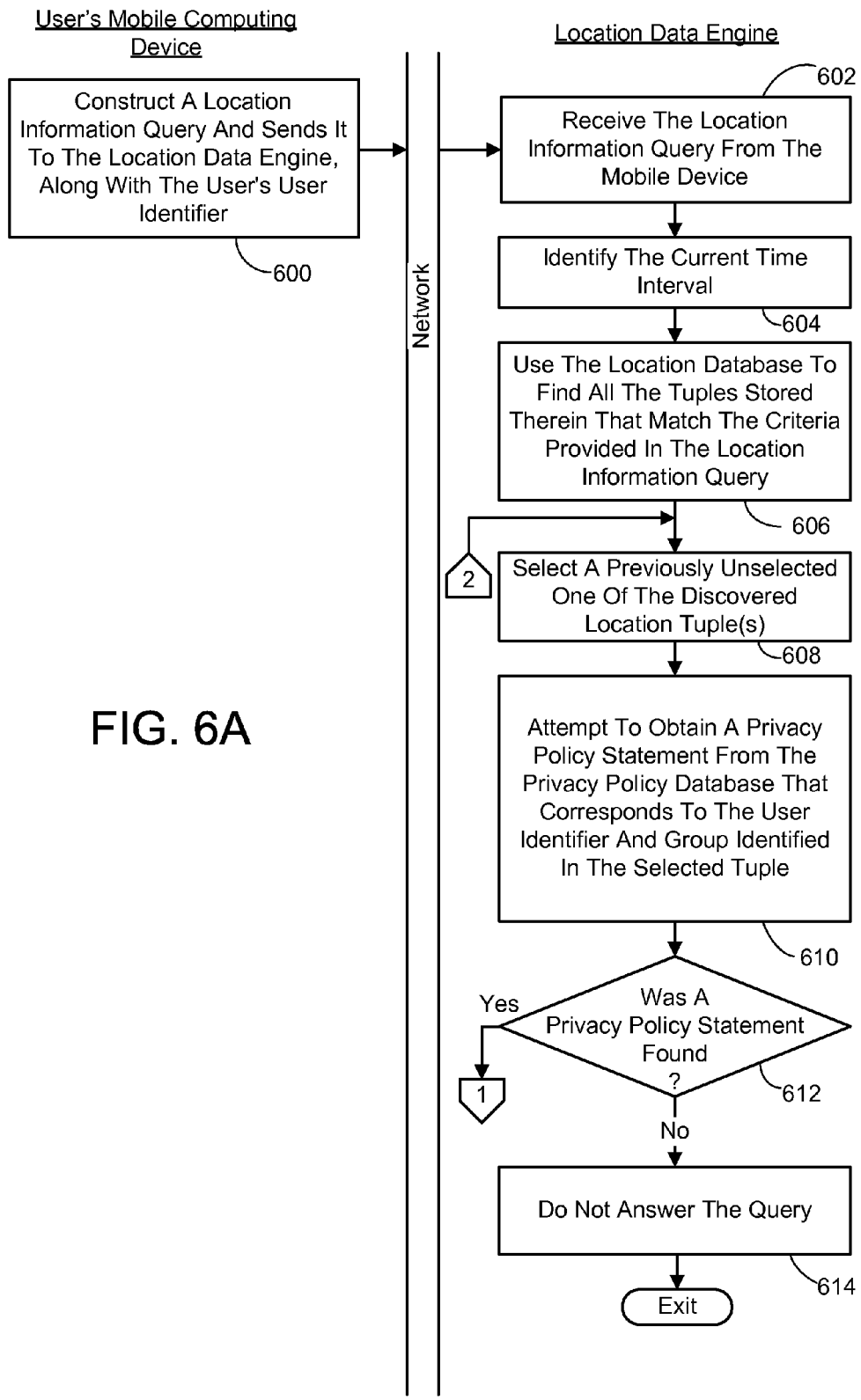
FIGS. 6A-B are a continuing flow diagram generally outlining an implementation of the part of the process of FIG. 1 involving mechanisms for handling location information queries by a location service.
Figure 6B:
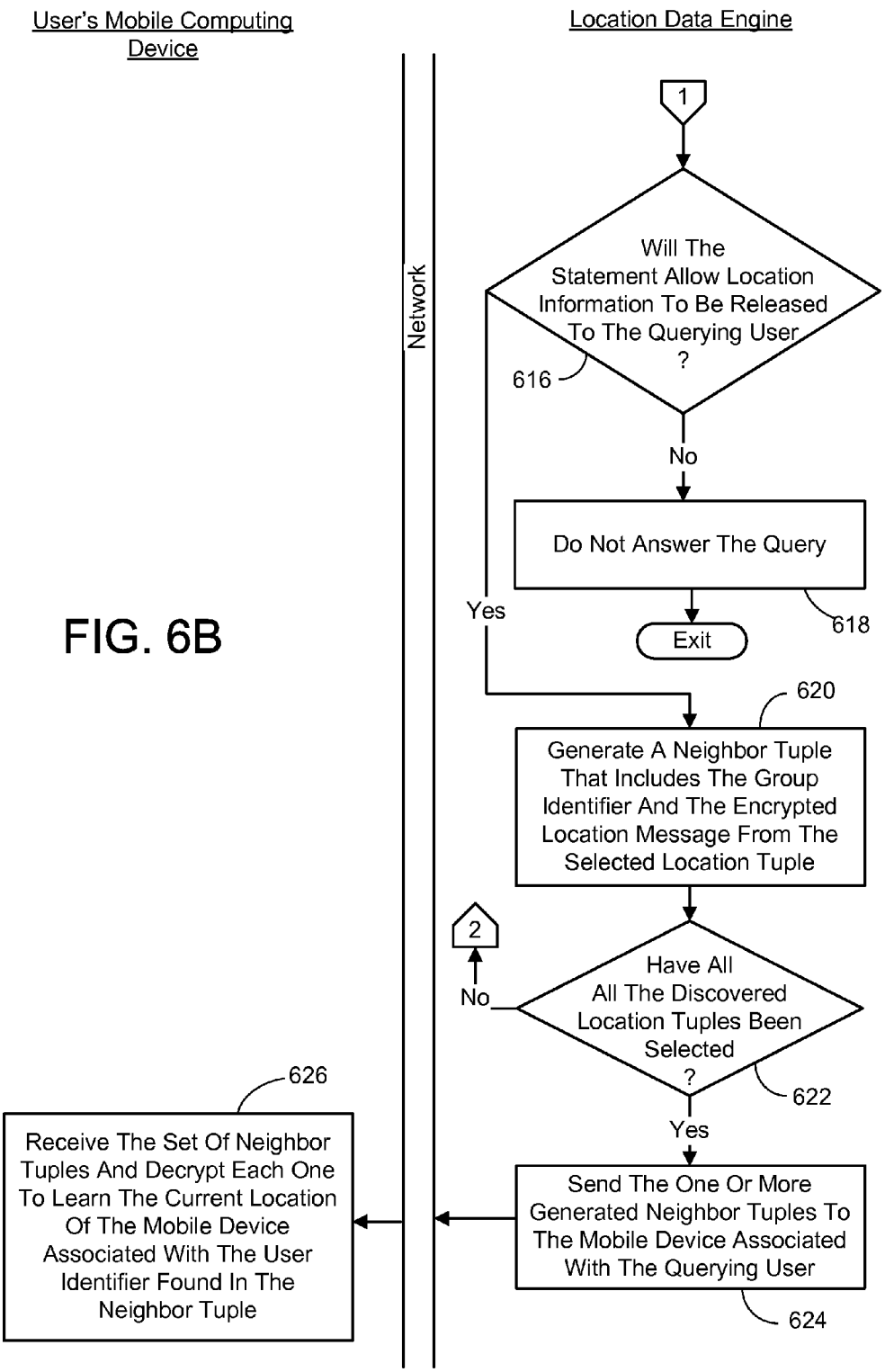

Given the foregoing, in one implementation, location information queries are handled as follows. Referring to FIGS. 6A-B, a user constructs a location information query as described previously and sends it via their mobile device to the location data engine, along with their user identifier (600). The location data engine receives the location information query (602), identifies the current time interval (604) and uses the location database to find all the tuples stored therein that match the criteria provided in the location information query (606). For example, suppose the location information query specifies a particular group and the current time interval, and nothing else. As described previously, this would correspond to a query to find the current location of the members of the specified group. Recall that a location tuple in the location database can identify a group, user identifier, time interval, location token (i.e., the encrypted grid coordinates of the mobile device associated with the user identifier), and the encrypted location message (in the form of an encryption of the user identifier, a location of a mobile device associated with the user identifier, and the time associated with that location). Thus, the location data engine would find the tuples in the location database that pertained to the specified group and the current time interval.

A previously unselected location tuple found by the location data engine (assuming at least one tuple is found) is selected (608) and it is determined if location information contained therein can be revealed in accordance with the applicable privacy policy statement. More particularly, the location data engine attempts to obtain a privacy policy statement from the privacy policy database that corresponds to the user identifier and group identified in the selected tuple (610). It is then determined if a privacy policy statement was found (612). If no such privacy policy statement is found, then in this implementation the location data engine is not allowed to answer the query (614) and the procedure ends. In other implementations, the lack of a privacy policy statement can be interpreted as an absence of any disclosure limitations, and the requested information would be provided. If, on the other hand, a privacy policy statement is found, the elements therein are reviewed, and it is determined if the statement will allow location information to be released to the querying user (616). For example, in the previously provided example where the querying user wants to know the current location of the members of the specified group, the location data engine would use the privacy policy statement to determine if the querying user is allowed to receive the requested location of the user associated with the statement. It would also determine if the group associated with the querying user is allowed to receive the requested location of the user associated with the statement. The location data engine would further determine if the querying user is allowed to receive the requested location information for the specified time interval (i.e., the current time interval in this example). Still further, the location data engine would determine if the querying user's mobile device is in a specified location (as represented by a location token), and also determine whether the user associated with the statement is in a specified location (as represented by a location token). As described previously, the privacy policy statement may not specify all the foregoing criteria for releasing information and if an element is not specified it is assumed the requested information can be releases no matter what the status of that element (assuming no other criteria prevents the release).

If it is determined that the privacy policy statement will not allow location information to be released to the querying user or application, then the location data engine is not allowed to answer the query (618) and the procedure ends. However, if it is determined that the privacy policy statement will allow location information to be released to the querying user, then the location data engine generates an aforementioned neighbor tuple that includes the group identifier and the encrypted location message from the selected location tuple (620). It is then determined if all the discovered location tuples have been selected and processed (622). If not, then actions 608 through 622 are repeated. If, however, all the discovered location tuples have been selected and processed, then the one or more neighbor tuples that were generated by the location data engine are sent to the mobile device associated with the querying user (624), unless all the discovered location tuples that have been selected have been processed and no neighbor tuples were generated, then the location data engine informs the user that there were no matches. When neighbor tuples are sent, the querying user's mobile device receives the set of neighbor tuples and decrypts each one to learn the current location of the mobile device associated with the user identifier from the neighbor tuple (626). It is noted that in one implementation the decryption procedure is the same as that described in connection with the pull rendezvous service (see FIG. 4B, actions 420 through 424).

2.0 The Computing Environment

A brief, general description of a suitable computing environment in which portions of the location brokering technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 7:
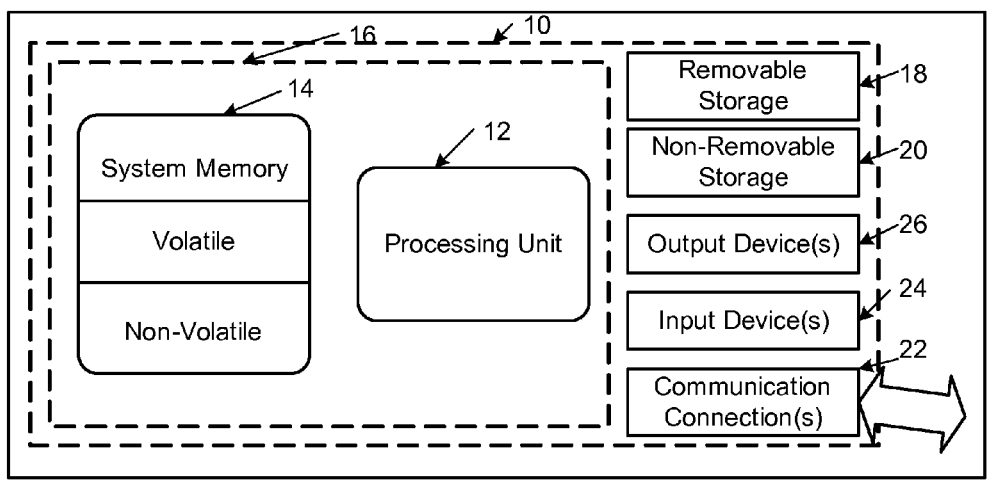
FIG. 7 is a diagram depicting a general-purpose computing device constituting an exemplary system for implementing location-brokering technique embodiments described herein.

FIG. 7 illustrates an example of a suitable computing system environment. The computing system environment is only one example of a suitable computing environment and is not intended to suggest any limitation as to the scope of use or functionality of location brokering technique embodiments described herein. Neither should the computing environment be interpreted as having any dependency or requirement relating to any one or combination of components illustrated in the exemplary operating environment. With reference to FIG. 7, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 7 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 7 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The location brokering technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

In the foregoing description of embodiments for location brokering, the focus was exclusively on mobile devices. However, the described subject matter is also applicable to any communication-enabled computing device that is able to capture location information or provide readings that could be used to determine a user's location—even if it is stationary.

Any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for location brokering, comprising:
using one or more computers to perform the following process actions:
encrypting location data associated with multiple communication-enabled devices, wherein for each communication-enabled device associated with a user in each group of three or more communication-enabled device users, said location data encryption comprises encrypting grid coordinates of a grid cell of a location grid in which the location of the communication-enabled device falls, but not the location within the grid cell, via an encryption scheme using a group encryption key and an initialization vector associated with the group, wherein the initialization vector associated with a group is computed based on a secret shared between the communication-enabled device users of the group and a current time interval such that the initialization vector computed by members of a group within the same time interval matches, but varies from one time interval to the next and so the encrypted location data for communication-enabled devices associated with users in the same group and located in the same grid cell within the same time interval match, and
said location data encryption further comprises,
receiving information from the communication-enabled device, wherein said information comprises,
a user identifier associated with a user of the communication-enabled device,
location data concerning the location of the communication-enabled device, and
an initialization vector for each group of users that the user of the communication-enabled device is a member of,
identifying grid coordinates of a grid cell in which the communication-enabled device's location falls,
ascertaining the current time associated with the establishment of the received information and a current time interval in which the ascertained current time falls, and
for each group the user belongs to,
obtaining an encryption key associated with the group,
encrypting the identified grid coordinates for the group via an encryption scheme using the encryption key and initialization vector associated with the group,
encrypting a location message for the group comprising at least an encryption of the location of the communication-enabled device,
generating a location tuple, said location tuple comprising the encrypted grid coordinates for the group and the encrypted location message for the group, and
storing the location tuple generated for the group in a location database; and
providing at least one location service that gives users location-related information based on the encrypted location data, comprising,
receiving a query from a communication-enabled device associated with a querying user which asks for the location of each communication-enabled device associated with other users who belong to a group that the querying user also belongs to and who are currently located in the same grid cell as the querying user,
obtaining encrypted grid coordinates associated with the current location of the querying user,
finding location tuples in the location database that include encrypted grid coordinates that match the querying user's encrypted grid coordinates and designating each location tuple discovered to be a matching location tuple, for each matching location tuple, generating a neighbor tuple comprising the encrypted location message associated with the matching location tuple, and sending the generated neighbor tuple or tuples, if any, to the communication-enabled device associated with a querying user.

2. A computer-implemented process for location brokering, comprising:

using one or more computers to perform the following process actions:

encrypting location data associated with multiple communication-enabled devices, wherein for each communication-enabled device associated with a user in each group of three or more communication-enabled device users, said location data encryption comprises encrypting grid coordinates of a grid cell of a location grid in which the location of the communication-enabled device falls, but not the location within the grid cell, via an encryption scheme using a group encryption key and an initialization vector associated with the group, wherein the initialization vector associated with a group is computed based on a secret shared between the communication-enabled device users of the group and a current time interval such that the initialization vector computed by members of a group within the same time interval matches, but varies from one time interval to the next and so the encrypted location data for communication-enabled devices associated with users in the same group and located in the same grid cell within the same time interval match, and said location data encryption further comprises, receiving information from the communication-enabled device, wherein said information comprises, a user identifier associated with a user of the communication-enabled device, location data concerning the location of the communication-enabled device, and an initialization vector for each group of users that the user of the communication-enabled device is a member of, identifying grid coordinates of a grid cell in which the communication-enabled device's location falls, ascertaining the current time associated with the establishment of the received information and a current time interval in which the ascertained current time falls, identifying grid coordinates of adjacent grid cells surrounding the grid cell in which the communication-enabled device's location falls, for each group the user belongs to, obtaining an encryption key associated with the group, encrypting the identified grid coordinates for the group via an encryption scheme using the encryption key and initialization vector associated with the group, encrypting a location message for the group comprising at least an encryption of the location of the communication-enabled device, encrypting the identified grid coordinates of each adjacent grid cell surrounding the grid cell in which the communication-enabled device's location falls for the group via the encryption scheme using the group encryption key and initialization vector associated with the group, generating a location tuple, said location tuple comprising the encrypted grid coordinates for the group, and the encrypted location message for the group, and the encrypted grid coordinates for the group of each adjacent grid cell surrounding the grid cell in which the communication-enabled device's location falls, and storing the location tuple generated for the group in a location database; and providing at least one location service that gives users location-related information based on the encrypted location data.

3. The process of claim 2, wherein the process action of providing at least one location service that gives users location-related information based on the encrypted location data, comprises the process actions of:

receiving a query from a communication-enabled device associated with a querying user which asks for the location of each communication-enabled device associated with other users who belong to one or more of the groups that the querying user also belong to and who are currently located in the vicinity of the querying user, wherein the vicinity of the querying user comprises the grid cell in which the location of the communication-enabled device in the possession of a querying user falls and adjacent grid cells surrounding the grid cell in which the location of the communication-enabled device in the possession of a querying user falls;

obtaining encrypted grid coordinates associated with the current location of the querying user and those of adjacent grid cells surrounding the grid cell in which the current location of the querying user falls;

finding location tuples in the location database that include encrypted grid coordinates which match any of the obtained encrypted grid coordinates and designating each location tuple discovered to be a matching location tuple;

for each matching location tuple, generating a neighbor tuple comprising the encrypted location message associated with the matching location tuple; and sending the generated neighbor tuple or tuples, if any, to the communication-enabled device associated with the querying user.

4. The process of claim 2, wherein the location tuple further comprises a user identifier associated with a user of the communication-enabled device and the time interval in which the ascertained current time fell, and wherein the process action of providing at least one location service that gives users location-related information based on the encrypted location data, comprises the process actions of:

periodically scanning the location database to identify pairs of location tuples that have a time interval which corresponds to a current time interval and wherein the encrypted grid coordinates of a first tuple of the tuple pair corresponding to the grid cell where the associated communication-enabled device is located is the same as at least one of the encrypted grid coordinates of the second tuple of the tuple pair; and whenever at least one location tuple pair is identified, for each identified tuple pair, generating a first neighbor tuple comprising the encrypted location message associated with a first location tuple of the identified tuple pair under consideration, sending the first neighbor tuple to the communication-enabled device associated with the user identifier found in the second location tuple of the identified tuple pair under consideration, generating a second neighbor tuple comprising the encrypted location message associated with the second location tuple of the identified tuple pair under consideration, and sending the second neighbor tuple to the communication-enabled device associated with the user identifier found in the first location tuple of the identified tuple pair under consideration.

5. A computer-implemented process for location brokering, comprising:

using one or more computers to perform the following process actions:

encrypting location data associated with multiple communication-enabled devices, wherein for each communication-enabled device associated with a user in each group of three or more communication-enabled device users, said location data encryption comprises encrypting grid coordinates of a grid cell of a location grid in which the location of the communication-enabled device falls, but not the location within the grid cell, via an encryption scheme using a group encryption key and an initialization vector associated with the group, wherein the initialization vector associated with a group is computed based on a secret shared between the communication-enabled device users of the group and a current time interval such that the initialization vector computed by members of a group within the same time interval matches, but varies from one time interval to the next and so the encrypted location data for communication-enabled devices associated with users in the same group and located in the same grid cell within the same time interval match, and said location data encryption further comprises, receiving information from the communication-enabled device, wherein said information comprises, a user identifier associated with a user of the communication-enabled device, location data concerning the location of the communication-enabled device, and an initialization vector for each group of users that the user of the communication-enabled device is a member of, identifying grid coordinates of a grid cell in which the communication-enabled device's location falls, ascertaining the current time associated with the establishment of the received information and a current time interval in which the ascertained current time falls, and for each group the user belongs to, obtaining an encryption key associated with the group, encrypting the identified grid coordinates for the group via an encryption scheme using the encryption key and initialization vector associated with the group, encrypting a location message for the group comprising at least an encryption of the location of the communication-enabled device, generating a location tuple, said location tuple comprising the encrypted grid coordinates for the group and the encrypted location message for the group, and storing the location tuple generated for the group in a location database; and providing at least one location service that gives users location-related information based on the encrypted location data, wherein the location tuple further comprises a user identifier associated with a user of the communication-enabled device and the time interval in which the ascertained current time fell, and wherein providing at least one location service that gives users location-related information based on the encrypted location data, comprises:

periodically scanning the location database to identify pairs of location tuples having the same encrypted grid coordinates and a time interval that correspond to a current time interval, and whenever at least one location tuple pair is identified, for each identified tuple pair, generating a first neighbor tuple comprising the encrypted location message associated with a first location tuple of the identified tuple pair under consideration, sending the first neighbor tuple to the communication-enabled device associated with the user identifier found in the second location tuple of the identified tuple pair under consideration, generating a second neighbor tuple comprising the encrypted location message associated with the second location tuple of the identified tuple pair under consideration, and sending the second neighbor tuple to the communication-enabled device associated with the user identifier found in the first location tuple of the identified tuple pair under consideration.

* * * * *